United States Patent [19]

Berger et al.

[11] Patent Number: 4,993,915
[45] Date of Patent: Feb. 19, 1991

[54] PACKET DEPALLETIZER

[75] Inventors: Maurice Berger, Cortaillod; Jean Cestonaro, Marin, both of Switzerland

[73] Assignee: Fabriques de Tabac Reunies, S.A., Neuchatel, Switzerland

[21] Appl. No.: 385,105

[22] Filed: Jul. 26, 1989

[30] Foreign Application Priority Data

Aug. 10, 1988 [CH] Switzerland .......................... 3014/88

[51] Int. Cl.⁵ .............................................. B65G 59/02
[52] U.S. Cl. ................................ 414/796.9; 294/87.1; 414/792.6; 414/792.9; 414/929
[58] Field of Search .............................. 294/87.1, 907; 414/792.6, 792.9, 796.7, 796.9, 623, 929, 751, 753; 901/47

[56] References Cited

U.S. PATENT DOCUMENTS

| | | | |
|---|---|---|---|
| 3,206,041 | 9/1965 | McGrath | 414/796.9 X |
| 3,869,049 | 3/1975 | Selusnik et al. | 414/929 X |
| 3,967,737 | 7/1976 | Peralta et al. | |
| 3,974,922 | 8/1976 | Selusnik et al. | |
| 4,789,295 | 12/1988 | Boucher, Jr. et al. | 294/907 X |

FOREIGN PATENT DOCUMENTS

| | | | |
|---|---|---|---|
| 377465 | 3/1985 | Austria . | |
| 0071864 | 2/1983 | European Pat. Off. . | |
| 3514487 | 10/1986 | Fed. Rep. of Germany . | |
| 2205300 | 12/1988 | United Kingdom | 414/796.9 |

Primary Examiner—Frank E. Werner
Assistant Examiner—Janice Krizek
Attorney, Agent, or Firm—Jeffrey H. Ingerman

[57] ABSTRACT

A pallet (4) bearing a load of objects (5) disposed in horizontal layers formed of parallel rows aligned in a certain direction (Y) is raised step by step on a frame (1) by a lift (2, 3). A transfer arrangement (7) provided with claws (31) is mounted on a carriage (8). A control causes the claws to engage under each of the objects of a row so that this row is secured to the transfer arrangement, after which the row is placed on a conveyor (10) which then transfers it to another conveyor (11). This latter conveyor moves in the aforementioned direction and brings each object to the entry station (14) of a machine (15).

9 Claims, 8 Drawing Sheets

PACKET DEPALLETIZER

This invention relates to materials handling equipment, and more particularly to automatic depalletizing apparatus capable of moving objects disposed in superimposed layers and formed of parallel and adjacent rows onto a pallet, and of bringing them one by one to an entry station of a machine, of the type having lift means for lifting the pallet step by step and bringing the layers to a predetermined height Z, transfer means movable in a horizontal direction X, a discharge conveyor likewise movable in the same direction X, and means for distributing the objects in the entry station.

The problem of automatically depalletizing a load of objects disposed on a pallet arises in numerous materials handling operations, and especially in the cigarette industry with the feeding of packers. Packing machines are known to be fed with cigarettes, on the one hand, and with the elements constituting their packaging, on the other hand, i.e., aluminum foil and sheets called blanks. A blank is a sheet of cardboard previously cut and marked so that it can be folded, hinged down, and closed in the packer to constitute the wrapping of the pack of cigarettes. Blanks are supplied in the form of stacks of flat sheets, each comprising 250 sheets, for example; and these stacks—which represent the objects to be handled in the case of the present specification—are supplied on standard pallets, disposed in superimposed layers of rows of packets aligned in directions Y and X. Between the layers are cardboard separators of the same size as the arrangement of stacked rows on the pallet, and these separators must be discarded each time a stacked layer of blanks is completely removed.

Until now, it has not been possible to design and produce apparatus capable of taking over a full pallet and moving each of the stacks of blanks placed on that pallet one by one, fully automatically and with the required accuracy, into the entry station of a packer. Hence these packers have had to be fed manually. This manual operation is tedious work which ties up the personnel in a way which is all the more bothersome as the working speed of these packing machines is steadily increasing, so that the feed of packets of blanks to the packers is an operation which must be carried out reliably, consistently, and rapidly.

U.S. Pat. No. 3,967,737 discloses a depalletizer of the type initially mentioned. It comprises a plurality of movable carriages, each bearing transfer means, a discharge conveyor, and a secondary conveyor transporting the objects in a direction perpendicular to that of the discharge conveyor. Associated with each carriage are transfer means comprising a pincer and capable of seizing by horizontal gripping a row of objects disposed according to the direction of travel of the discharge conveyor.

Such an arrangement does not facilitate the distribution of the objects one by one to the entry station of the following machine. Moreover, it would not be applicable to objects which, like the packets of blanks, are formed of superimposed elements consolidated into a unit merely by their own weight.

U.S. Pat. No. 3,974,922 likewise relates to a depalletizer for automatically unloading recipients disposed in lines and rows, by superimposed layers, on a pallet which moves vertically on a lift. This installation suffers from the same drawback as that previously mentioned.

German Disclosed Application (DOS) No. 35 14487 describes an installation which distributes stacks of corrugated paper sheets to a machine. The format of the sheets is rectangular, and each stack has a length which covers the whole width of the machine. The stacks are gripped laterally, then partially lifted on one side to permit the lateral insertion of a support arm under the stack. This equipment is complicated and would also not apply to the depalletization of packets of blanks.

It is an object of this invention to provide improved depalletizing apparatus which is fully automatic and carries out all the necessary manipulations on packets of blanks from pallets conveying these packets.

To this end, in the automatic depalletizing apparatus according to the present invention, of the type initially mentioned, the transfer means comprise a transfer facility capable of moving all the objects of one row in one operation, this row being oriented in a horizontal direction Y perpendicular to the direction of travel X of the transfer means, and of placing all these objects of the row on the discharge conveyor after a translatory movement.

A preferred embodiment of the invention, as well as various possible modifications thereof, will now be described in detail with reference to the accompanying drawings, in which.

Figure 1:
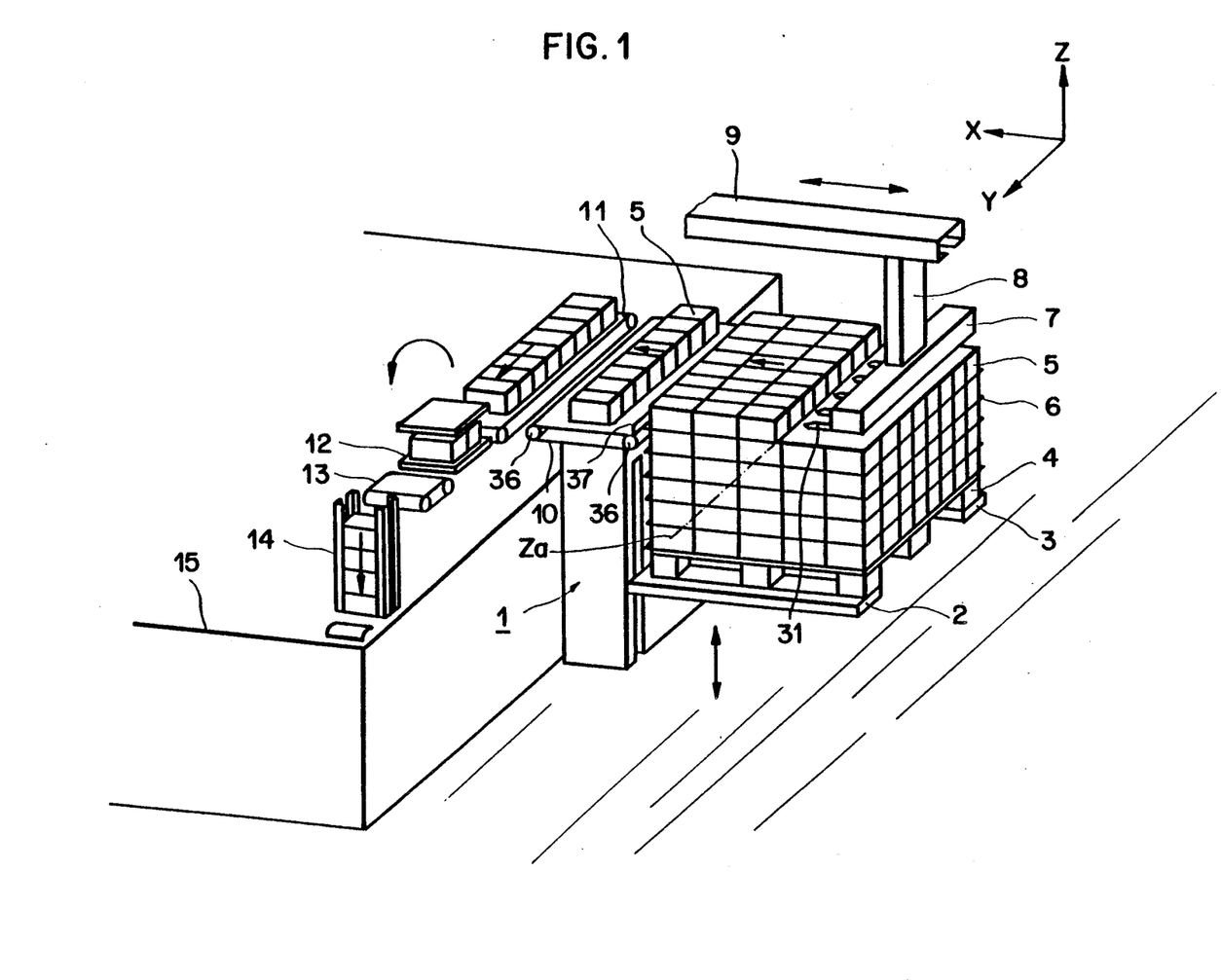
FIG. 1 is a diagrammatic and simplified perspective view showing the main elements of the apparatus.

The main elements of the apparatus may be seen in FIG. 1. A vertical pedestal 1 comprises lift means (not shown) from which two lift arms 2 and 3 project parallel to one another in a direction X defined by a trirectangular axis system X, Y, Z which will be adopted in this specification to situate the various movements and the orientations of the various elements of the apparatus to be described. Lift arms 2 and 3 extend horizontally and are arranged to be able to receive directly from the conveying apparatus a standard-type pallet 4 loaded with objects 5 disposed in superimposed layers, themselves formed of straight, parallel rows. Each of the objects 5 is a stack consisting of, say, 250 blanks on the order of 120×250 mm in size. The load on pallet 4 further includes separators 6 which are sheets of cardboard disposed between the layers of objects 5. Once the loaded pallet 4 has been placed on lift 2, 3, a control device (not shown) causes it to be lifted step by step, each step comprising an upward movement in direction Z over a distance equivalent to the height of the stack 5 and the thickness of a separator 6. Each layer may thus be brought to a level $Z_a$ (FIG. 1) where transfer means 7 are operative. These means are hooked to a carriage assembly 8 movable horizontally on a guide rail 9 disposed in the top part of the apparatus and aligned in direction X. Transfer means 7 are so arranged as to be able to seize an entire row of objects in the top layer of the stack and to transfer this row to a discharge conveyor 10 installed above frame 1. By means of this transfer, each row is thus withdrawn from the layer of which it forms part and is separated from the other rows of that layer. This separated layer is moved in direction X until it reaches a pathway 11 leading toward the entry station. If need be, conveyor 10 may be equipped with an inverting device, known per se, capable of turning over all the packets 5 of a row by 180° about an axis parallel to the row. Thus, after this operation, the rear edge of the blanks is at the front in the direction of travel X. Depending on the arrangement of the packer and the position of the described apparatus relative thereto, this operation may be necessary. Pathway 11 is likewise a secondary endless-belt conveyor. Its width corresponds to the length of the blanks, while its length corresponds to that of each of the rows of the load on pallet 4. Packets 5 are carried by conveyor 11 in direction Y and, at the end thereof, are separated from one another. If need be, as illustrated in FIG. 1, an inverting device 12 may be placed at the end of supply pathway 11. In this case, the inverting device is loaded with two objects 5 at the same time, then inverts them by 180° about an axis oriented in direction X so as to place them on an entry conveyor 13 which is still another endless belt mounted on two rollers. From there, each object 5 is transferred to a slide 14 which constitutes the entry station into the packer, designated generally by reference numeral 15 and not forming part of the present invention.

The apparatus being described further comprises means for discarding each of the separators 6 as soon as the entire layer of objects 5 placed on that separator has been transferred by transfer means 7 to conveyor 10. Guide rail 9 guides a movable pedestal which forms part of assembly 8 bearing the assembly of means 7. The device, shown in FIG. 1, may be housed within a tunnel-shaped superstructure accommodating the motors, as well as the control circuit, so that the entrance of this tunnel is accessible for a transporter placing the pallets more or less precisely on the two lifting arms 2, 3.

All the driving means and control means associated with the apparatus operate under the supervision of detectors, particularly position detectors, so that all the control parameters of the various moving parts can be adjusted as the need arises and dictates. Thus, the same apparatus can be adjusted for each individual case so as to handle loads of blanks of different formats. Detectors of operating abnormalities are also provided for stopping operation in the event of a false move or damage of an object. The necessary means are likewise provided for automatically adjusting the operation of the apparatus according to the greater or lesser accuracy with which the pallets are placed on lift 2, 3.

Figure 3:
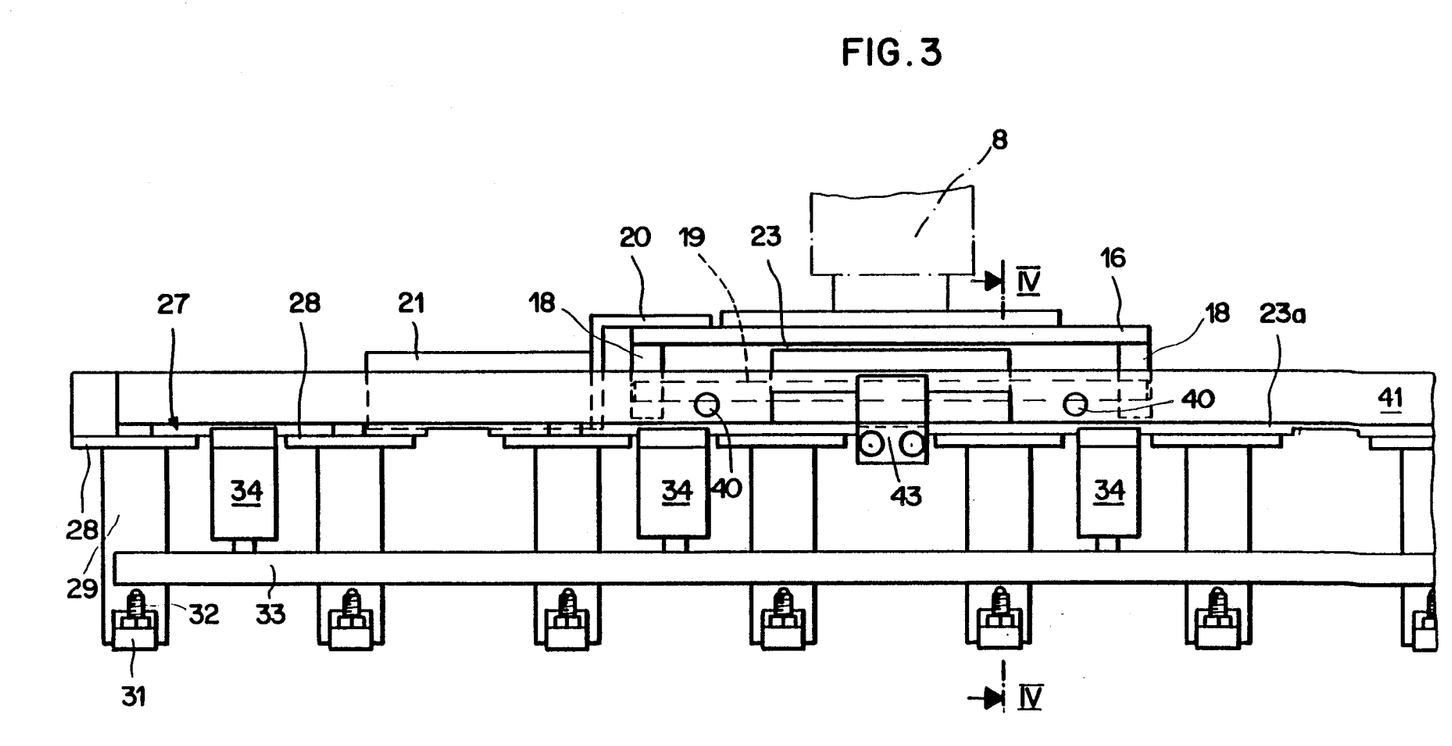
FIG. 3 is an elevation of the transfer means in the direction of arrow 3 in FIG. 2.
Figure 4:
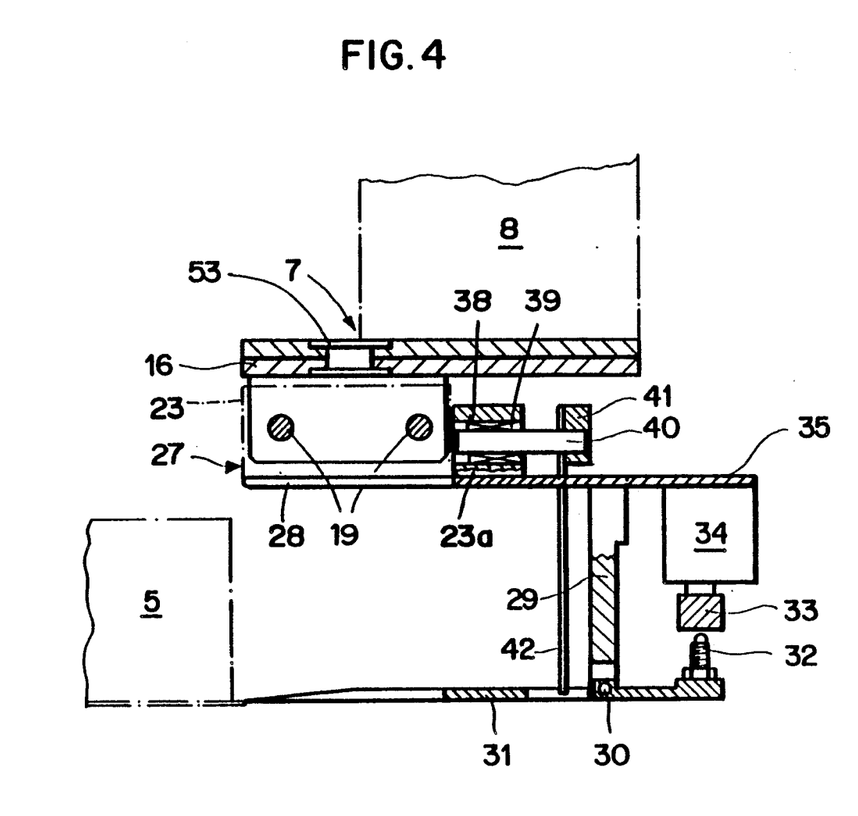
FIG. 4 is a section taken on the line IV—IV of FIG. 3.

The make-up of transfer means 7 in the embodiment of FIG. 1 will now be described in more detail with reference to FIGS. 2, 3, and 4.

Carriage 8 mainly comprises an upright connected to a chassis equipped with rollers (not shown) moving within rail 9. A drive motor and its associated control means drive carriage 8 in rail 9 and control the movements provided for in direction X as the installation operates. The upright of carriage 8 bears at the bottom a rectangular support plate 16 (FIGS. 2, 3, 4) pivoted about a vertical axis relative to upright 8. Joint 53 of plate 16 is supported by a similar plate fixed to upright 8 through two parallel oblong apertures 17 aligned in direction X. Apertures 17 serve as means for fixing the transfer device to the bottom of the upright of carriage 8 and thus permit the position of the transfer means to be adjusted in direction X relative to carriage 8. Rectangular plate 16 is integral at both ends with two lateral plates 18 supporting between them two parallel guide rods 19 disposed horizontally in direction Y. Likewise fixed to plate 16 is an angle bracket 20 which supports the stator and housing of an electric motor 21 capable of rotating a threaded rod 22 extending horizontally between guide rods 19. The mounting of the motor on angle bracket 20 and the connection between this motor and rod 22 are conventional mechanisms which need not be described in detail.

Figure 2:
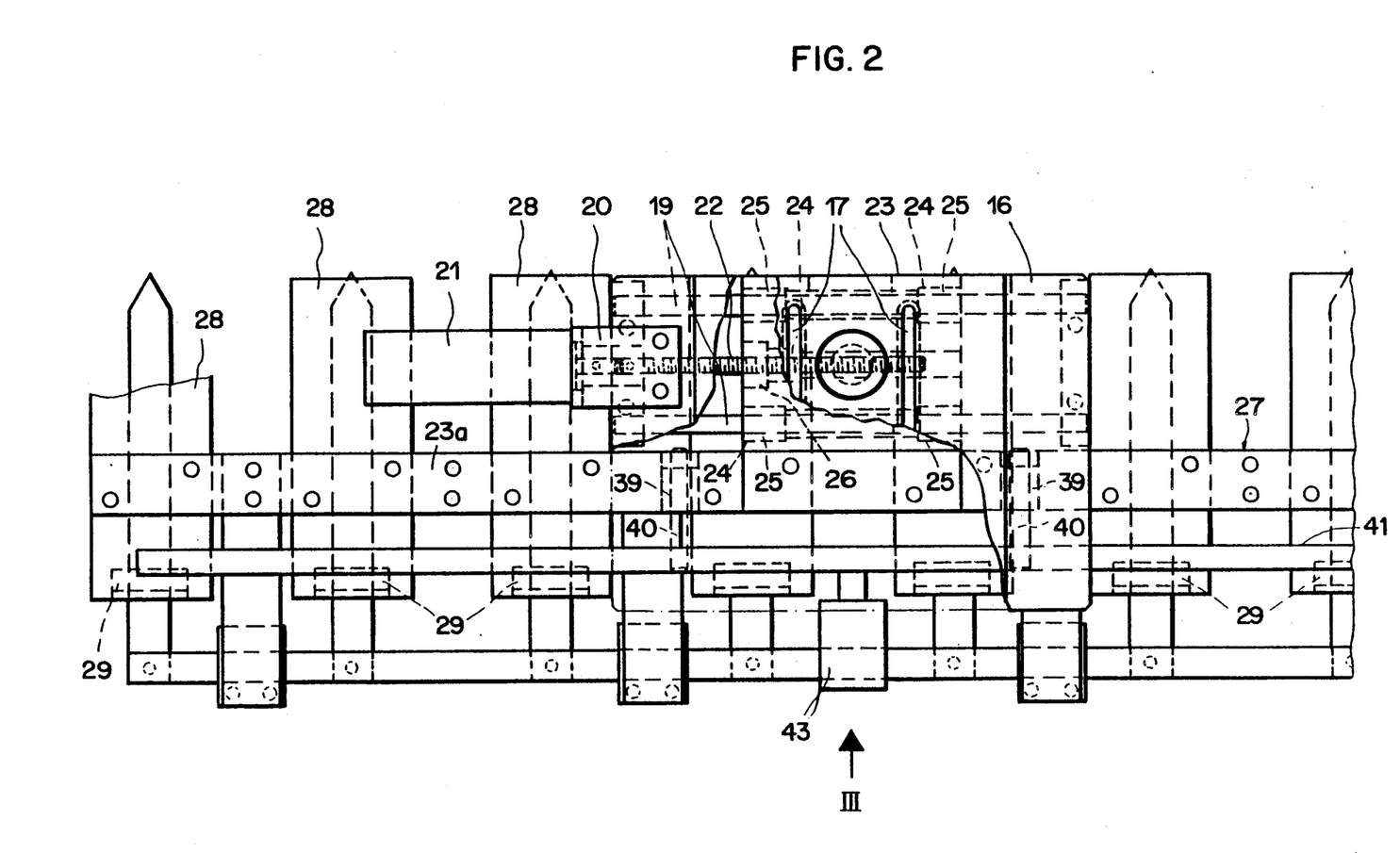
FIG. 2 is a top plan view on a larger scale of the transfer means in the preferred embodiment of the invention.

The transfer means proper, designated by reference numeral 7, comprise a truss 27 having a drive block 23 pierced by three parallel horizontal bores 24 (FIG. 2). Two of these bores are equipped with guiding slides 25 and guide the movements of truss 27 as a whole along bars 19. The third bore 24, disposed between the first two, is equipped with a nut 26 traversed by threaded rod 22 so that motor 21 serves to actuate block 23 in order to move truss 27 in direction Y and to adjust its position. Block 23 is integral with a support bar 23a extending horizontally in direction Y over a length equal to that of the rows of objects 5. Fixed beneath bar 23a at regular intervals are small backing plates 28 extending horizontally in direction X and having a fixed spacing corresponding to the width of the objects to be transferred. Thus, each backing plate 28 can be fitted under a stack of blanks 5 so as to secure it to transfer means 7 during a manipulation by claws, as will be seen below.

Fixed to the rearward end, in direction X, of each plate 28 is a claw post 29 extending vertically downward. At the bottom, post 29 is stirrup-shaped and bears a spindle 30 aligned in direction Y and serving as a pivot pin for a claw 31 extending horizontally in direction X under backing plate 28. Claw 31 is extended toward the rear and bears a vertically-adjustable control stop 32 intended to be actuated by a rigid bar 33 likewise disposed horizontally in direction Y and extending over the entire length of the rows of objects 5. Bar 33 is borne by the rods of four jacks 34, the cylinders of which are integral with fastening plates 35, likewise fixed to bar 23a between certain backing plates 28. By means of these four jacks, it is possible to control a vertical movement of control bar 33 which actuates the stops 32 of claws 31 and causes them to pivot at will. Opposing springs (not shown) may be provided. As is seen in FIG. 4, transfer means 7 can therefore simultaneously seize all of the stacks 5 of a row of stacks by a simple movement of carriage 8 in direction X and by actuating jacks 34.

The tips of claws 31 are brought beforehand into positions such that they are exactly at the level of the separator 6 on which the row to be unloaded is situated and at the foot of a stack of blanks, in the center of the rear edge of the blanks. From there, a movement of the carriage in direction X engages the tip of a claw under each of the stacks, after which actuation of jacks 34 causes each claw 31 to pivot upward and, consequently, to press the stack of blanks under which it is situated against the backing plate 28 immediately above. Through this maneuver, a whole row of packets of blanks is rigidly secured to the transfer means in one operation. The movement of carriage 8 allows the whole row of packets of blanks to be placed above conveyor 10. This conveyor is made up of an endless belt mounted on rollers 36 aligned in direction Y. The width of the conveyor is equal to the length of a row, and the distance over which it can move a row corresponds to the width of frame 1 and to the distance between the lift supporting pallet 4 and entry pathway 11 described above. Thus, when transfer means 7 have arrived above conveyor 10, they can carry out a maneuver which is the reverse of that previously described.

It has been shown in practice that in order reliably to engage claws 31 simultaneously beneath the several packets of blanks 5 of a row, quite precise commands and preparatory movements are necessary. A number of auxiliary devices provided for this purpose will now be described. The first auxiliary device is a control of motor 21 by means of sensors capable of detecting the positions of claws 31 in direction Y relative to the various objects (stacks 5) to be conveyed. Truss 27 is moved in direction Y until each claw 31 is exactly opposite the middle of the bottom edge of a stack.

Figure 8:
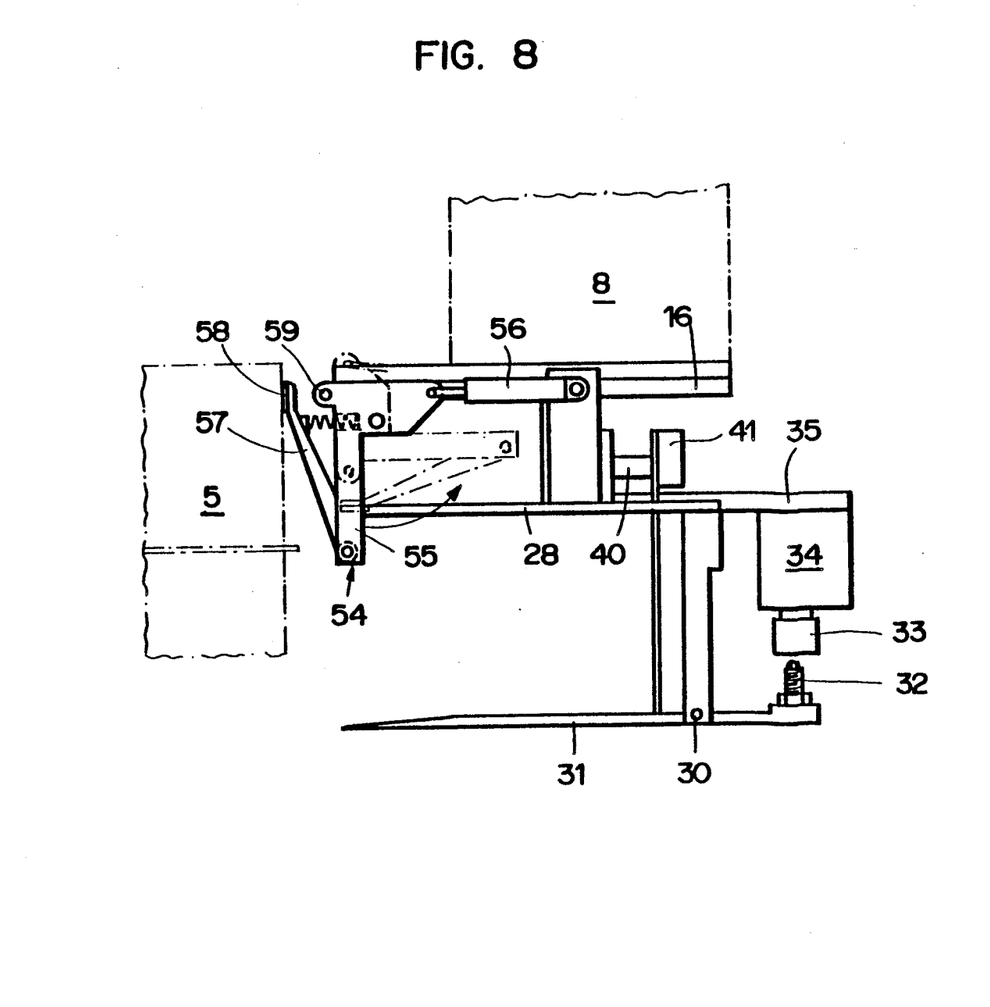
FIG. 8 is partial elevation of a retractable stop.

Another auxiliary device consists of joint 53 which permits truss 27 to pivot about a vertical axis relative to carriage 8. Associated with this device are stop assemblies 54 provided on each of the two plates 28 situated at the two ends of truss 27 (FIG. 8). Each stop assembly 54 comprises a lever 55 actuated by a jack 56 and pivoted about a horizontal axis a little above plate 28. Connected to this lever is a spring rod 57 bearing a stop stud 58. Situated at the level of this stop stud and above the support of the hinge pin of lever 55 is a detector 59.

Figure 6:
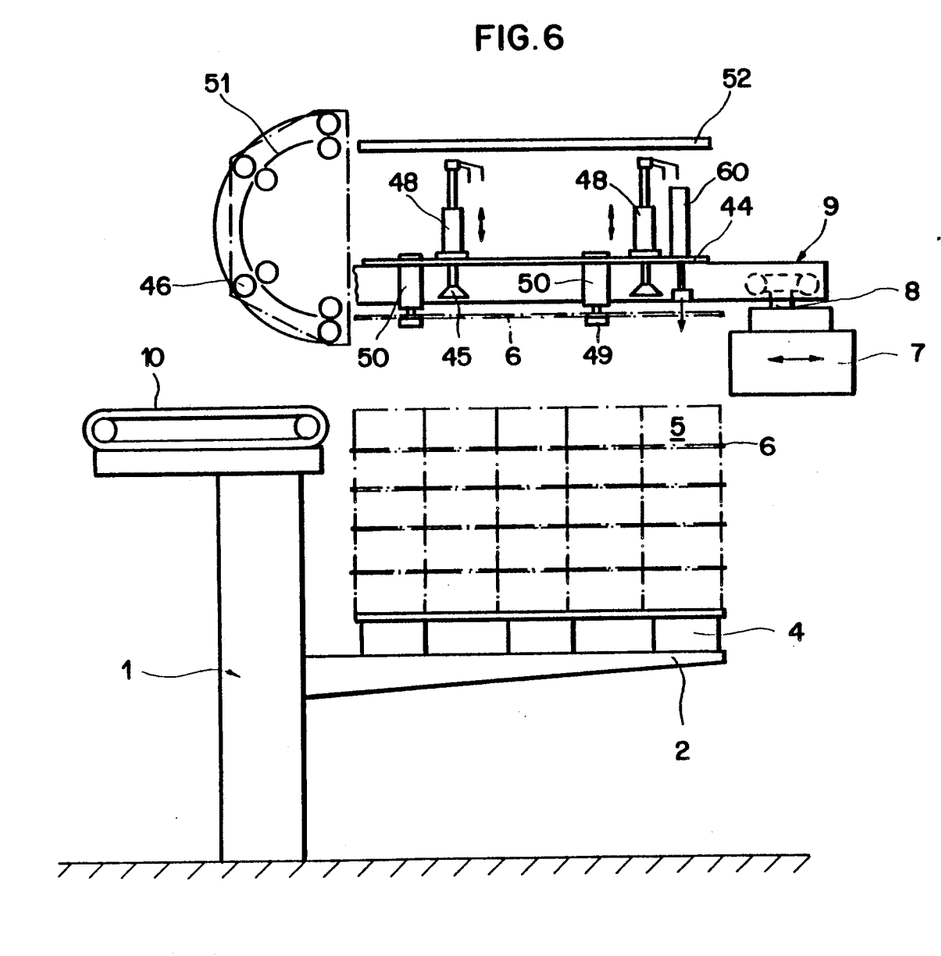
FIG. 6 is a diagrammatic elevation of the apparatus with the means for discarding the separators.

Normally, stop assembly 54 is kept aside, the rod of jack 56 being moved toward the front so that lever 55 is in horizontal position. However, when claws 31 are put in place, the operation to be carried out is to align the row of claws 31 with the rearward edge of the row of packets of blanks to be lifted and to center the set of claws 31 relative to the exact position of the row of packets of blanks. Therefore, at the beginning of the operation of transferring a layer, an operation of alignment and centering of transfer means 7 takes place. Stops 54 are brought into vertical position. The lift places the stack of packets of blanks at a level where the rear face of the stacks of the first row of the top layer is opposite studs 58, and the carriage is moved forward. This movement is monitored, for seizing the first row of a layer, by a sensor placed on the rail. When studs 58 come in contact with the rear faces of the stacks and cause rods 57 to flex, the studs block the space in front of detectors 59. It will be realized that the effect of this operation is to align truss 27 relative to the rear edge of the row of blanks, which might not be exactly parallel to direction Y. Furthermore, to avoid any risk of deformation of the packets of blanks situated at the ends of the row when bar 27 pivots about joint 53, provision is also made for locking jacks 60 (FIG. 6) which, during the alignment operation, are lowered and press on the top surface of the two packets of blanks situated at the ends of the row. When this operation has been effected, the claw tips are a few millimeters away from the rear faces of the packets of blanks of the row; and as the centering operation described above has previously been effected by control of motor 21 and movement of block 23, according to indications from a sensor (not shown).which detects the exact position of one of the sides of the stack of blanks, each of the claw tips is positioned for seizing one of the packets of blanks. The pallet is lowered so that stops 54 can be inverted and moved aside, then the pallet rises again with a monitored movement until the tips of claws 31 rest on the protruding rear edge of the separator 6 supporting the row of packets of blanks to be unloaded.

An advancing movement in direction X will then be controlled in such a way that each of the claws is engaged under one of the packets of blanks, and the operations described above can take place, i.e., all the stacks 5 of a row will be seized at the same time. Once the pallet has been lowered, the centering device will once more go into operation to position the row relative to conveyor 10, and the row can be deposited on that conveyor.

For depositing packets 5 securely on conveyor 10, the described transfer means further comprise an ejector. At two locations along its length, bar 27, which constitutes the truss of the transfer means and is integral with block 23, has a bore 38 (FIG. 4) provided with a slide 39. In each of these slides 39 there moves an adjusting bar 40 (FIG. 4), at the rearward end of which is fixed a strip 41 placed longitudinally in direction Y. Facing each post 29, strip 41 bears a vertical rod 42. This rod is controlled by a jack 43 (FIG. 2), the cylinder of which is fixed to the central bar of the truss of the transfer means, and the rod of which is integral with strip 41. By actuating this jack, when transfer means 7 are above conveyor 10, packets 5 are pushed until they become disengaged from claws 31. At the same time, the claws are lowered, and carriage 8 is retracted, so that packets of blanks 5 are simultaneously deposited on conveyor 10. From there, this row is immediately transferred onto pathway 11, and the operations already described above can take place. During this time, carriage 8 resumes its initial position and is consequently able to seize the following row of the layer at the level $Z_a$. To facilitate these operations, lift 2, 3 is likewise raised and lowered to present a new row in front of claws 31 or, on the contrary, to free the space to allow carriage 8 to advance. A longitudinal stop 37, situated at the level of separator 6 when the layer is in its unloading position, has the function of preventing any longitudinal displacement of the separator when the claws seize a row of packets of blanks. This function is important, above all when the rows still disposed on the pallet are few in number, and in particular when the last row is being seized. It is, in fact, important that the separator 6 remain stationary during that operation. Stop 37 is vertically displaceable so that it can move aside for carriage 8 to pass.

Figure 5:
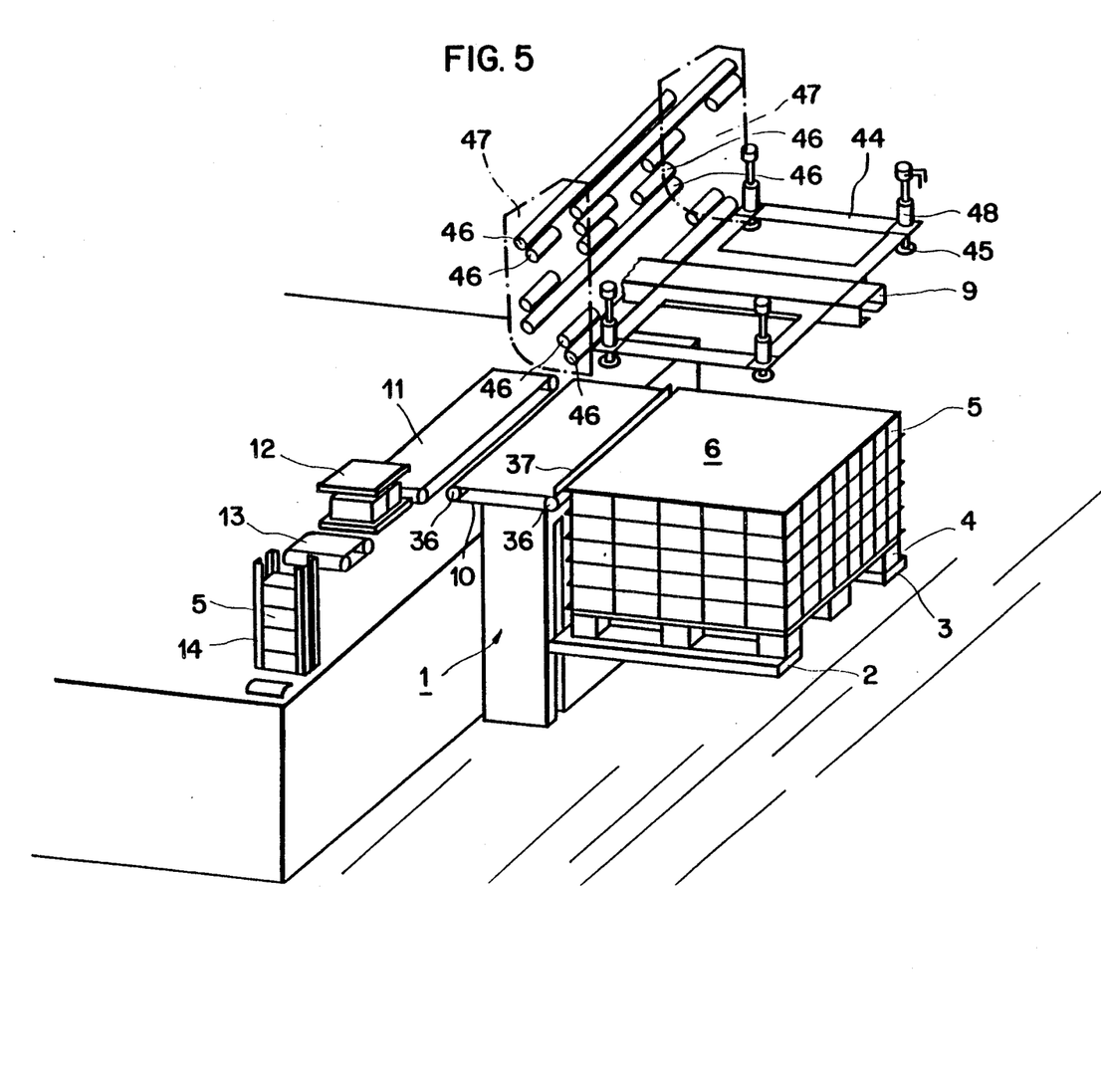
FIG. 5 is a view similar to FIG. 1, further showing the means for discarding the separators.
Figure 7:
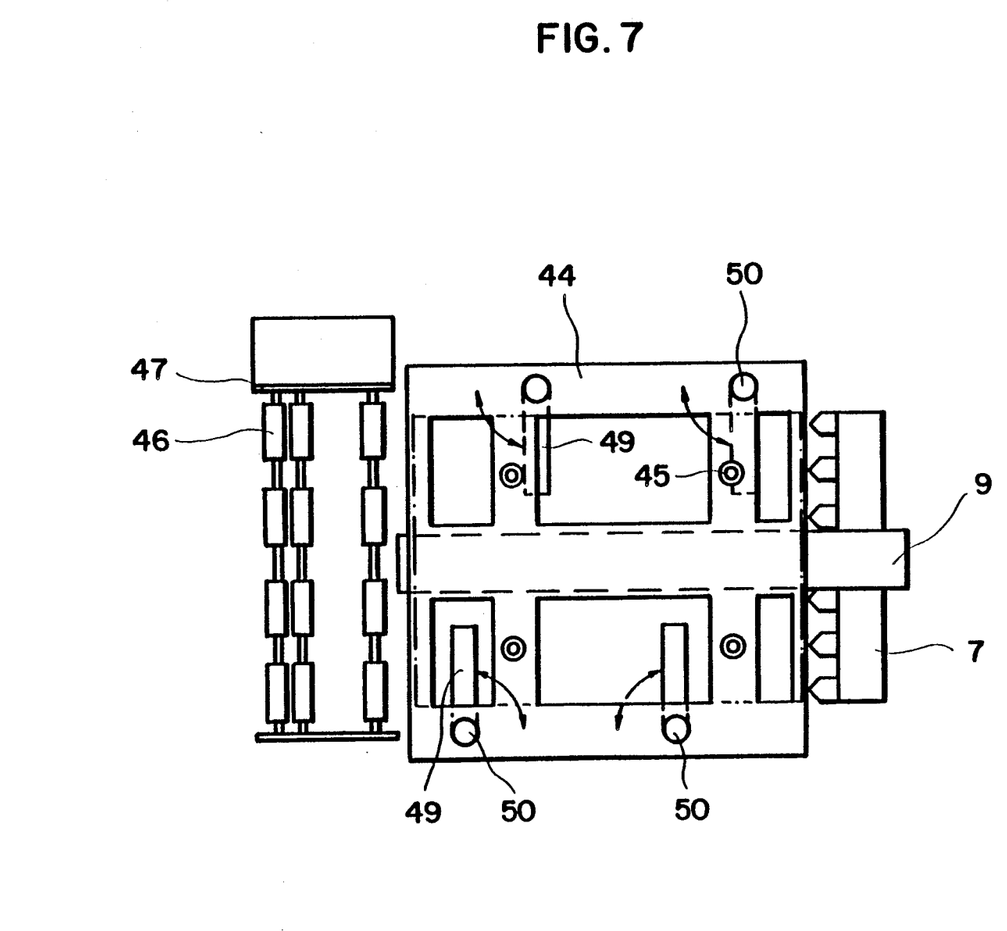
FIG. 7 is a top plan view of the means for discarding the separators.

There remain to be described the means for automatically discarding separator 6 when a layer of objects 5 has been completely unloaded. These discarding means are shown diagrammatically in FIGS. 5, 6, and 7. As may be seen, the length of rail 9 is such that carriage 8 can be completely retracted toward the right, thus allowing lift 2, 3 to co-operate with the discarding means which are likewise supported and guided by rail 9. These discarding means comprise a fixed frame 44 bearing suction cups 45 associated with jacks 48. Conventional means connecting suctions cups 45 to a suction source are not shown. When a layer of packets of blanks 5 has been completely removed, pallet 4 is lifted in such a way that separator 6 is seized by suction cups 45, which have been lowered by means of jacks 48. Once separator 6 is fixed to suction cups 45, pallet 4 is lowered by means of lift 2, 3. Support laths 49, disposed horizontally under frame 44 and rotatable about vertical axes on rotating jack devices 50, are moved between a withdrawn position and the position shown in FIG. 7, after which suction cups 45 are lowered and deposit separator 6 on laths 49. At that moment, carriage 8 is advanced so that the front edge of block 23 pushes separator 6 until the latter's front edge is thrust between rollers 46. Their spindles are supported by sheet-metal frames 47 which also guide the separator. Frames 47 support several series of rollers 46, as well as the gearing necessary for driving these rollers by means of a motor. When the front edge of separator 6 has been gripped between the two series of rollers of the first drive assembly, this separator is moved and guided by an arcuately bent inner metal sheet 51 which guides the separator and engages it successively between the various series of rollers 46 until it has effected half a revolution about a horizontal axis oriented in direction Y and has come to rest upon a horizontal rack 52 placed above rail 9. By this means, the various separators can be recovered automatically, and consequently, all the operations for unloading a complete pallet can take place without any human intervention.

It was not obvious to produce a combination of means capable of operating reliably and automatically in order to carry out all these operations. Research has shown that the desired solution is possible in practice at least with the transfer means described above, but nonetheless other transfer means may equally well be envisaged, if need be.

Thus, in particular, the modifications which may be foreseen optionally with the apparatus described above consist in replacing claws 31, each fitting under one of the packets of blanks, by pairs of claws likewise capable of being mounted on spindles 30 and allowing two parallel claws to be engaged beneath each packet of blanks 5, which consequently ensure better grasping of the packet. This arrangement may be provided as a variation on the apparatus so that it can be put in place as a function of the differences in format of the blanks to be transferred.

However, the transfer means may equally well be designed in a totally different way, viz., in the form of a series of vertical pushers, each corresponding to one of the packets of a row. These pushers might be provided at the bottom with a scraper arranged to follow closely the top surface of the separator 6. Each pusher would be associated with a roller running on and pressing the separator 6. The transfer carriage with which this pusher assembly would be associated might therefore move all the rows of the transferred layer in direction X, one row pushing the other, so that, contrary to what has been described above, it would be the front row, in direction X, which would be transferred onto conveyor 10, the other rows being successively transferred in the same order. In this case, the retaining stop for the separator ought rather to be situated facing the rear edge of that separator, and not facing the front edge as shown in FIG. 1. For certain types of objects, this arrangement might be more favorable than the one previously described. It seems, however, that the arrangement described presents the advantage of being universally usable.

It will be noted that the apparatus described may transfer a row of objects even if certain objects are missing, without modifying the arrangement of the row.

What is claimed is:

1. Automatic depalletizing apparatus capable of moving objects disposed on a pallet in superimposed layers separated by cardboard separators and formed of parallel and adjacent rows on a pallet and of bringing the objects one by one to an entry station of a machine, said apparatus being of the type having lift means for lifting the pallet step by step and thereby moving the layers in a vertical direction Z to a predetermined level $(Z_a)$, transfer means movable in a horizontal direction X, a discharge conveyor likewise movable in said direction X, and distribution means for distributing the objects in the entry station, said distribution means comprising a secondary conveyor movable in said direction Y for simultaneously receiving all the objects of said one row moved by said discharge conveyor, wherein the improvement comprises:

transfer means including a transfer facility capable of moving all the objects of one row in one operation, said one row being oriented in a horizontal direction Y perpendicular to the direction of travel X of said transfer means, and of placing all the objects of said one row on said discharge conveyor after a translational movement, said transfer facility comprising a plurality of pincers oriented in direction X and aligned along direction Y and a carriage supporting said transfer means, said pincers being mounted on said carriage and each being capable of grasping one of the objects of a row to be transferred for shifting it onto said discharge conveyor by movement of said carriage, said carriage including a pedestal, a truss adjustable in direction Y relative to said pedestal, a plurality of claws disposed parallel to direction X and pivoted on said truss about a single axis parallel to direction Y, and a jack-type control integral with said truss and capable of causing said claws to pivot simultaneously about said axis.

2. The apparatus of claim 1, further comprising discarding means for eliminating the separators.

3. The apparatus of claim 2, wherein said transfer means are movable along a way such that said lift means are able to lift the pallet to a level $(Z_1)$ higher than said predetermined level $(Z_a)$, wherein said discarding means for eliminating the separators comprise auxiliary seizing means having a predetermined space of action, and wherein said predetermined level $(Z_a)$ is determined in such a manner that a separator freely resting on a layer at said predetermined level lies within said space of action.

4. The apparatus of claim 1, further comprising a control assembly movable in direction X and an ejector capable of modifying the depth of engagement of said claws under the objects of a single row, said ejector including vertical stops connected to said control assembly.

5. The apparatus of claim 1 further comprising, on said carriage, guiding and adjusting means between said pedestal and said truss, cooperating with sensor means and motor means, for moving said truss relative to said pedestal prior to a transfer operation, for placing each of said claws in a predetermined position relative to a predetermined object of the row, and for placing said plurality of claws in a position where said single axis is parallel to the row of objects to be grasped.

6. The apparatus of claim 1, wherein said discharge conveyor and said secondary conveyor are endless-belt conveyors having horizontal upper belt lengths at the same level, the width of said discharge conveyor corresponding to the length of a row of objects, and the width of said secondary conveyor corresponding to the transverse (X) dimension and one of the objects.

7. The apparatus of claim 5 wherein said guiding and adjusting means comprises a pedestal body, a pedestal upright, a vertical-axis joint between said body and said upright, and linear guiding means between said truss and said pedestal body.

8. The apparatus of claim 7 wherein a screw-nut system and a drive motor are disposed between said truss and said pedestal body for linearly moving said truss for placing each of said claws in said predetermined position.

9. The apparatus of claim 7 wherein said adjusting means further comprises stop means at both ends of said truss, cooperating with both ends of a row of objects to be grasped, and with said joint, for placing said plurality of claws in a position where said single axis is parallel to the row of objects to be grasped.

* * * * *

UNITED STATES PATENT AND TRADEMARK OFFICE
CERTIFICATE OF CORRECTION

PATENT NO. : 4,993,915

DATED : February 19, 1991

INVENTOR(S) : Maurice Berger et al.

It is certified that error appears in the above-identified patent and that said Letters Patent is hereby corrected as shown below:

Claim 6, column 8, line 68, "and" should be -- of --.

Signed and Sealed this

Nineteenth Day of October, 1993

Attest:

BRUCE LEHMAN

Attesting Officer

Commissioner of Patents and Trademarks